US011248832B2

(12) United States Patent
Okada

(10) Patent No.: US 11,248,832 B2
(45) Date of Patent: Feb. 15, 2022

(54) NEGATIVE PRESSURE RELEASE PORT AND REFRIGERATION DEVICE

(71) Applicant: PHC HOLDINGS CORPORATION, Tokyo (JP)

(72) Inventor: Tadashi Okada, Saitama (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 301 days.

(21) Appl. No.: 16/298,775

(22) Filed: Mar. 11, 2019

(65) Prior Publication Data

US 2019/0204003 A1    Jul. 4, 2019

Related U.S. Application Data

(63) Continuation of application No. PCT/JP2017/030160, filed on Aug. 23, 2017.

(30) Foreign Application Priority Data

Sep. 12, 2016    (JP) ............................. JP2016-177697

(51) Int. Cl.
   *F25D 21/04*      (2006.01)
   *F25D 23/06*      (2006.01)
   (Continued)

(52) U.S. Cl.
   CPC ........... *F25D 17/047* (2013.01); *F25D 21/04* (2013.01); *F25D 23/061* (2013.01); *F16K 17/04* (2013.01)

(58) Field of Classification Search
   CPC ...... F25D 17/047; F25D 23/061; F25D 21/04; F16K 17/04; F16K 49/002; F16K 17/164
   See application file for complete search history.

(56) References Cited

U.S. PATENT DOCUMENTS 3,813,896 A * 6/1974 Lebahn ................. F25D 17/047
                                                62/409
3,952,542 A   4/1976 Berkowitz
                    (Continued)

FOREIGN PATENT DOCUMENTS

CN        105571043 A    5/2016
DE     202014008327 U1   1/2016
                    (Continued)

OTHER PUBLICATIONS

English Language Translation of FR2405413 A1, Cluzan, Roger, translated Jun. 28, 2021 (Year: 1979).*

(Continued)

*Primary Examiner* — Cassey D Bauer
(74) *Attorney, Agent, or Firm* — McDermott Will and Emery LLP

(57) ABSTRACT

Provided is a negative pressure release port that can prevent freezing in a channel. This negative pressure release port comprises: a cylindrical member made of a pipe in which a fluid can pass through and a base; a heating element disposed on one end inside the pipe; a retaining member that retains the heating element; a rib that connects an inner wall face of the pipe and the retaining member; and a check valve that is provided inside the base provided more toward the other end than the heating element, that allows air passing through the interior of the base to flow from the other end to the one end, and prevents flow from the one end to the other end.

7 Claims, 4 Drawing Sheets

(51) Int. Cl.
*F25D 17/04* (2006.01)
*F16K 17/04* (2006.01)

(56) References Cited

U.S. PATENT DOCUMENTS

| | | |
|---|---|---|
| 4,662,270 A | 5/1987 | Fiddler et al. |
| 4,759,198 A | 7/1988 | Yamada |
| 5,421,775 A | 6/1995 | Honda |
| 6,176,776 B1 | 1/2001 | Finkelstein et al. |
| 6,374,620 B1 | 4/2002 | Markey |
| 2006/0225455 A1 | 10/2006 | Weng |

FOREIGN PATENT DOCUMENTS

| | | |
|---|---|---|
| FR | 2405413 A1 | 5/1979 |
| JP | S53-26700 Y2 | 7/1978 |
| JP | S57-10343 B2 | 2/1982 |
| JP | S60-12171 U | 1/1985 |
| JP | S62-138189 U | 8/1987 |
| JP | 3803834 B2 | 8/2006 |
| JP | 2006-292352 A | 10/2006 |
| KR | 10-2003-0027910 A | 4/2003 |

OTHER PUBLICATIONS

International Search Report and Written Opinion issued in International Patent Application No. PCT/JP2017/030160; with partial English translation.
Extended European Search Report dated Jul. 24, 2019 for the corresponding European Patent Application No. 17848567.8.

* cited by examiner

NEGATIVE PRESSURE RELEASE PORT AND REFRIGERATION DEVICE

CROSS-REFERENCE OF RELATED APPLICATIONS

This application is the U.S. Continuation of International Patent Application No. PCT/JP2017/030160, filed on Aug. 23, 2017, which in turn claims the benefit of Japanese Application No. 2016-177697, filed on Sep. 12, 2016, the entire disclosures of which Applications are incorporated by reference herein.

TECHNICAL FIELD

The present invention relates to a negative pressure release port and a refrigeration apparatus.

BACKGROUND ART

Hitherto, an ultra-low temperature refrigeration apparatus that stores cells, microorganisms, and the like has been known. The refrigeration apparatus is separated from the external space by a heat insulating member and includes a heat-insulating box having an internal space in which items are accommodated, and a heat-insulating door arranged on an opening in heat-insulating box on a front side thereof.

When the heat-insulating door is closed, the internal space is sealed, and the internal space is maintained in an ultra-low temperature state. Meanwhile, when the heat-insulating door is opened in order to take the items in and out, the air in the internal space flows out to the external space, and the air in the external space flows into the internal space.

When the heat-insulating door is closed in the abovementioned state, the air that has flowed in is rapidly cooled and contracts, and hence the internal space is brought into a negative pressure state. As a result, a pressure difference is generated between the external space and the internal space, and a situation where the heat-insulating door does not open even when the heat-insulating door is attempted to be opened again may occur.

In order to deal with the situation as above, a negative pressure release port is formed in some of those refrigeration apparatuses. The negative pressure release port includes a flow path that causes the internal space and the external space to communicate with each other, and air flows through the flow path.

As a result, when the internal space is brought into a negative pressure state, the air in the external space flows into the internal space through the negative pressure release port, and a pressure difference is not generated between the external space and the internal space.

There is a possibility that when air containing humidity from the outside flows in the internal space in the ultra-low temperature state, the moisture contained in the air freezes in the flow path or a place near an end portion of the flow path on the internal space side and blocks the flow path.

In order to deal with the problem as above, PTL 1 discloses a negative pressure release port apparatus including a conduit including a heat conductive body, a first opening portion exposed to an internal space, and a second opening portion exposed to an external space, in which a part of the heat conductive body of the conduit is wound around by heating coil.

In a negative pressure release port described in PTL 1, freezing in the flow path or a place near the end portion of the flow path on the internal space side is suppressed by heating the body.

CITATION LIST

Patent Literature

PTL 1
Japanese Patent Application Laid-Open No. 2006-292352

SUMMARY OF INVENTION

Technical Problem

However, in the negative pressure release port described in PTL 1, the heating coil is disposed on the outside of the body, and hence the diameter of the negative pressure release port becomes large. Therefore, a hole, which is for inserting the negative pressure release port and causes the external space and the internal space to communicate with each other, needs to be increased, and hence the heat retaining property decreases.

The negative pressure release port described in PTL 1 heats the body. Therefore, heat easily leaks to the outside of the body, and it is difficult to efficiently raise the temperature of the air in the flow path. The temperature of the entire body rises, and hence there is a possibility that the cooling ability of the refrigeration apparatus is affected.

An object of the present invention is to provide a negative pressure release port capable of efficiently heating air in a flow path, preventing condensation and freezing in the flow path, and removing ice generated in the flow path, and a refrigeration apparatus including the negative pressure release port.

Solution to Problem

A negative pressure release port according to the present invention includes: a cylindrical member that allows a fluid to pass through an inside of the cylindrical member; a heating element disposed in the cylindrical member on one end side of the cylindrical member; a holding member that holds the heating element; a connecting portion that connects an inner peripheral wall of the cylindrical member and the holding member to each other; and a valve provided on another end side with respect to the heating element, the valve allowing the fluid passing through the inside of the cylindrical member to flow from the other end side to the one end side, the valve preventing the fluid from flowing from the one end side to the other end side.

A refrigeration apparatus according the present invention includes: the negative pressure release port mentioned above; and a box separated from an external space by a heat insulating member, the box having an internal space in which an item is accommodated, wherein the negative pressure release port is provided in a through hole formed in the heat insulating member of the box so as to cause the external space and the internal space to communicate with each other, the negative pressure release port being provided in a state in which the one end side is exposed to the internal space and the other end side is exposed to the external space.

Advantageous Effects of Invention

According to the present invention, the air in the flow path of the negative pressure release port can be efficiently heated, the condensation and the freezing in the flow path can be prevented, and the ice generated in the flow path can be removed.

DESCRIPTION OF EMBODIMENT

An embodiment of the present invention is described below with reference to the accompanying drawings. The embodiment described below is an example, and the present invention is not limited to this embodiment.

Figure 1:
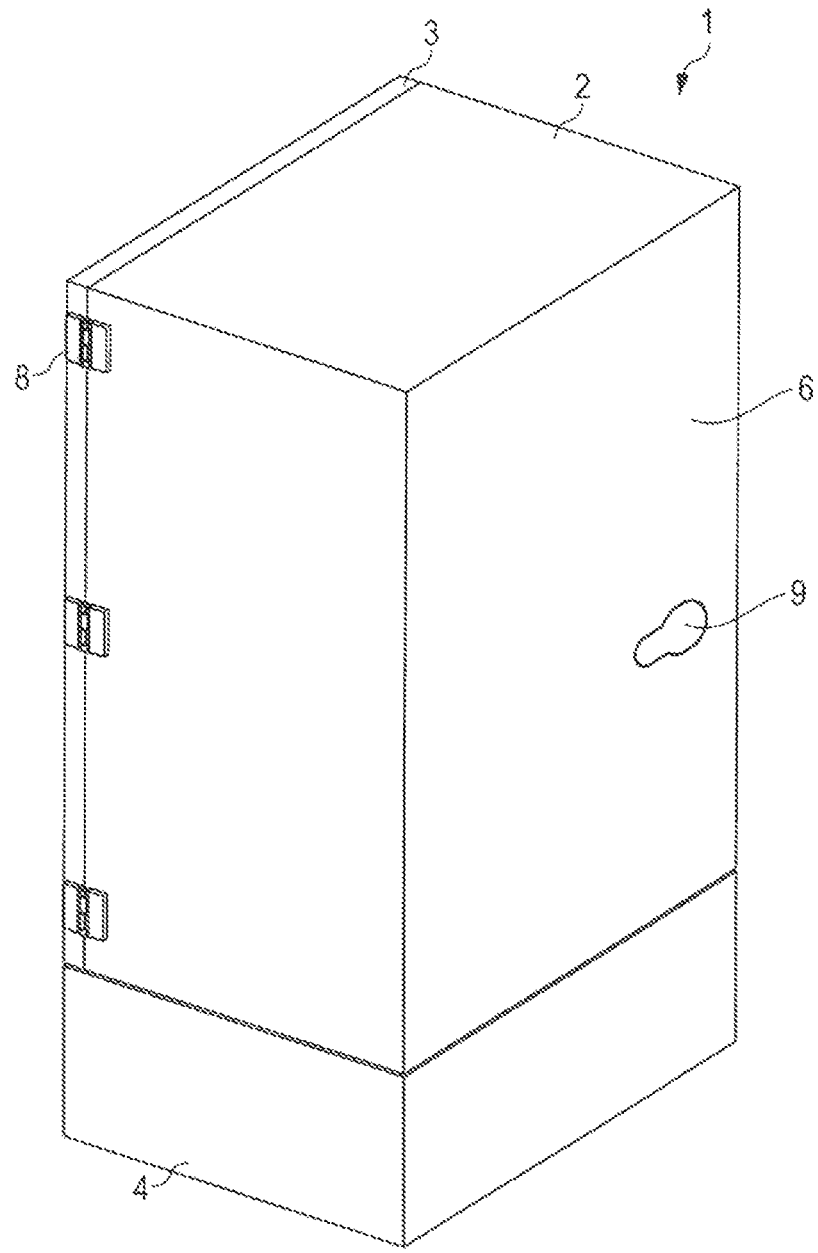
FIG. 1 is an overall configuration diagram of a binary refrigeration apparatus.

FIG. 1 is an overall configuration diagram of binary refrigeration apparatus 1. Binary refrigeration apparatus 1 includes main body 2 of which front surface is open, front surface door 3 provided on the front surface opening of main body 2 so as to be openable and closable, and machine room 4 provided below main body 2.

Main body 2 includes inner box 5 (described below; see FIG. 2) made of steel sheets and having an open front side, outer box 6 made of steel sheets, disposed on the outer side of inner box 5 with a space therebetween, and having an open front side, and urethane foam heat-insulating material 7 (described below; see FIG. 2) filled in the space between inner box 5 and outer box 6.

Front surface door 3 is fixed to a front surface of outer box 6 with use of hinges 8 so as to be openable and closable. In this embodiment, hinges 8 are fixed on three places on a side surface of outer box 6. Front surface door 3 is formed by enclosing a heat-insulating material with steel sheets.

Machine room 4 is disposed so as to support the entire bottom surface of outer box 6, and functions as a pedestal of main body 2. In machine room 4, a compressor, a condenser, and the like forming a part of a high-temperature-side refrigerant circuit and a low-temperature-side refrigerant circuit (not shown) are disposed.

As illustrated in FIG. 1, negative pressure release port 9 is provided on a rear surface of main body 2. Negative pressure release port 9 is provided so as to prevent a pressure difference from being generated between internal space 5a of inner box 5 and external space 6a of outer box 6.

Figure 2:
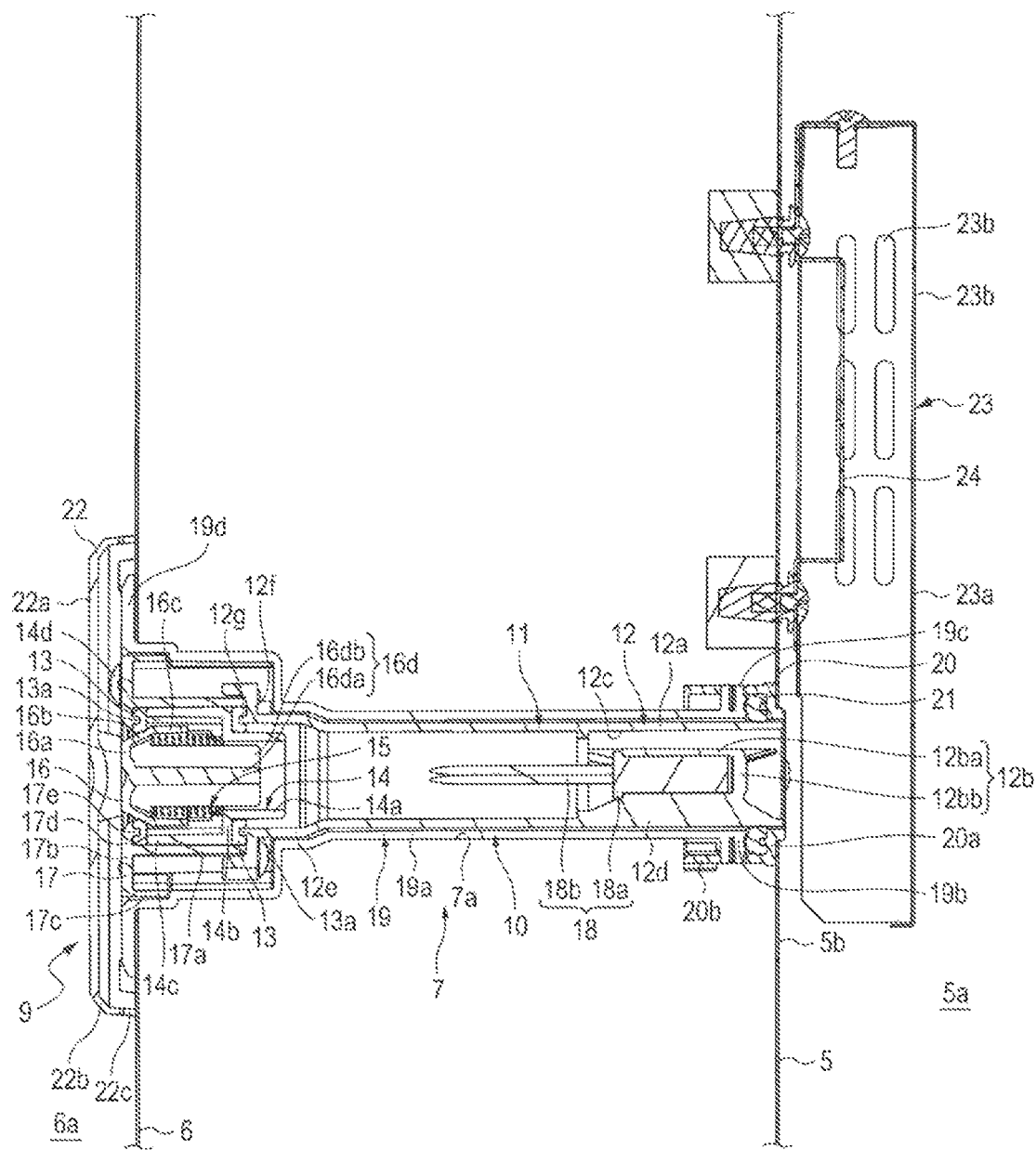
FIG. 2 is a cross-sectional view illustrating an attached state of a negative pressure release port.
Figure 3:
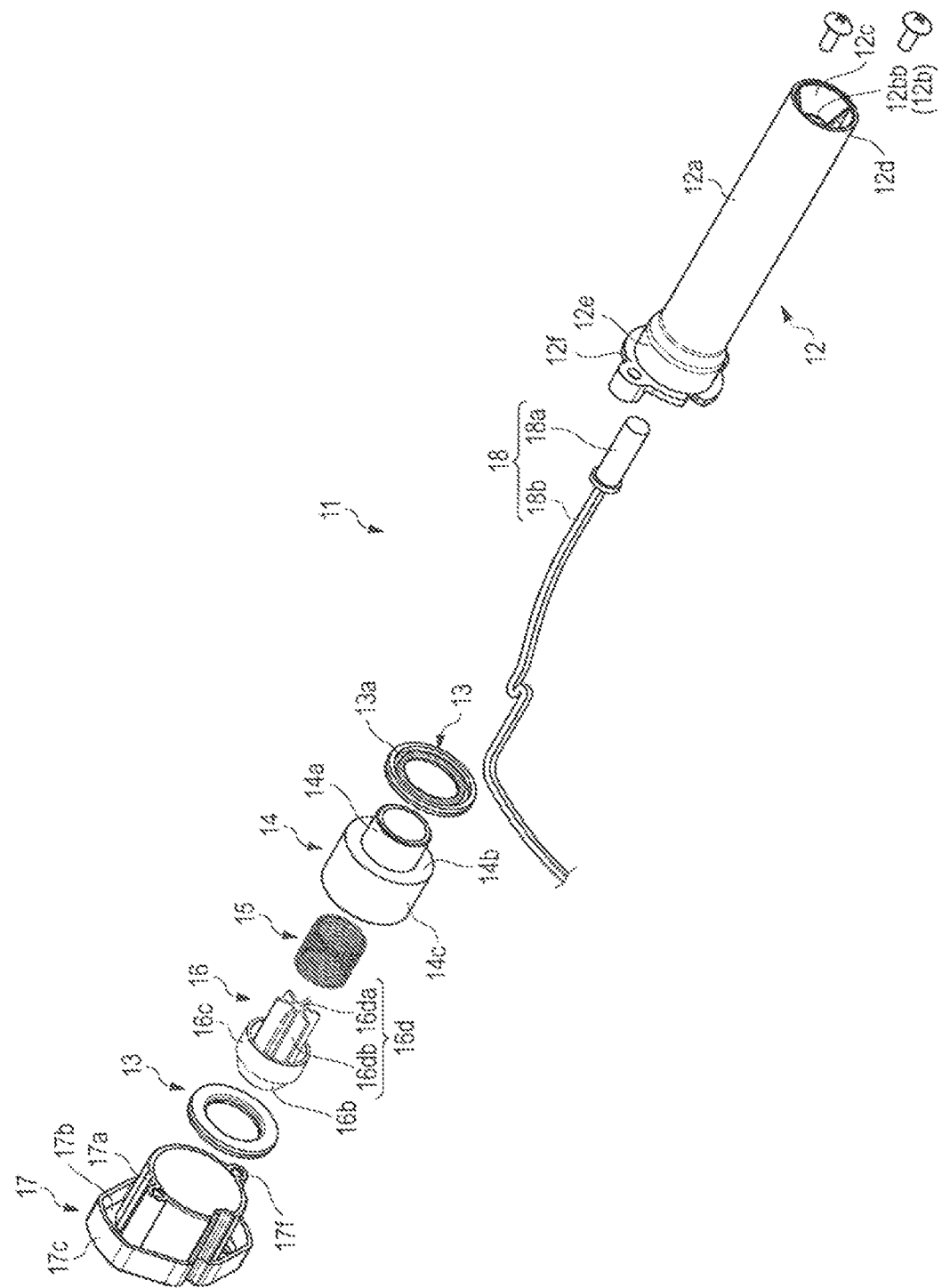
FIG. 3 is an exploded perspective view of a main body portion of the negative pressure release port.
Figure 4:
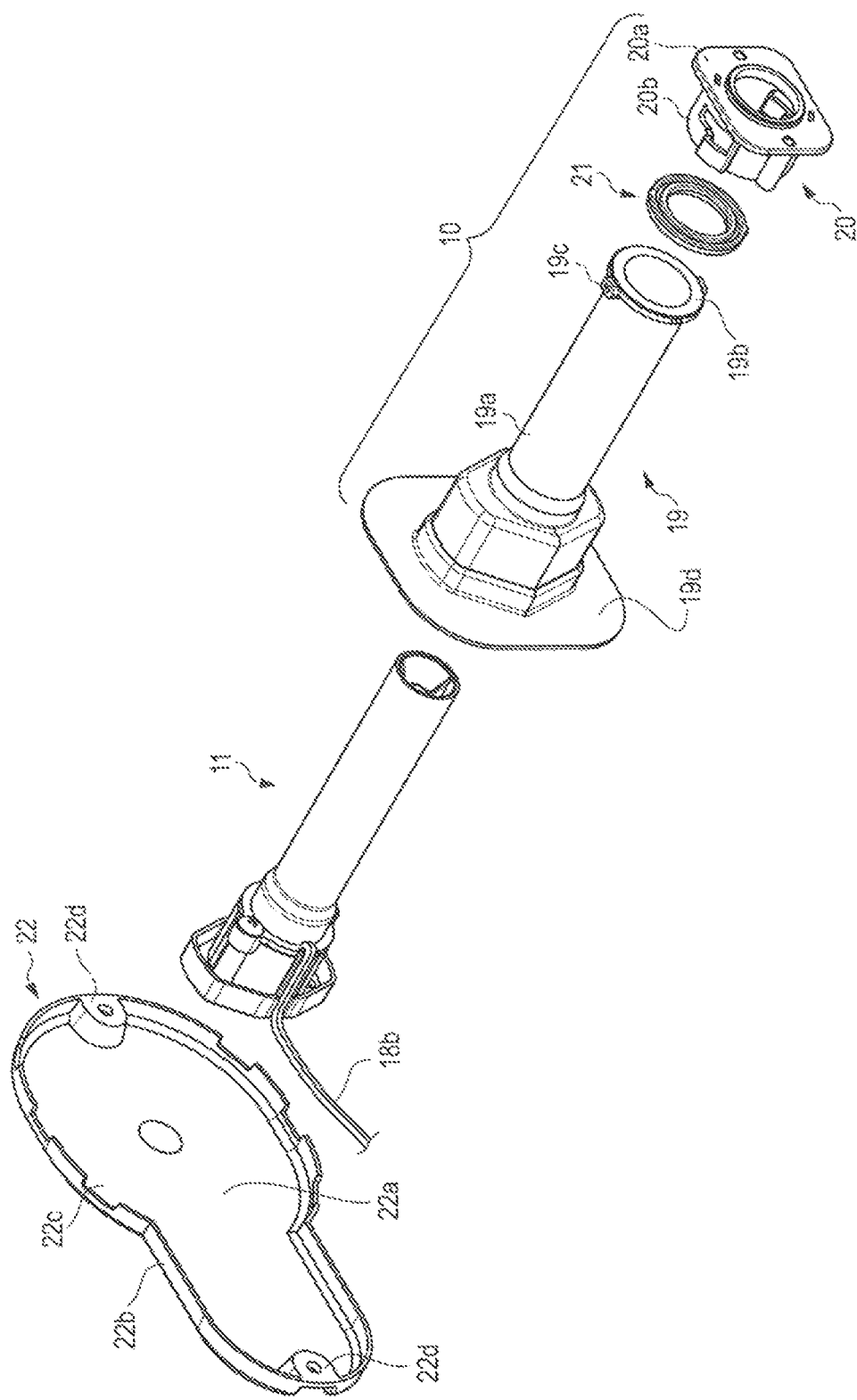
FIG. 4 is an exploded perspective view of peripheral components of the negative pressure release port.

Next, details of negative pressure release port 9 are described with reference to FIG. 2 to FIG. 4. FIG. 2 is a cross-sectional view illustrating an attached state of negative pressure release port 9. FIG. 3 is an exploded perspective view illustrating a main body portion of negative pressure release port 9. FIG. 4 is an exploded perspective view illustrating peripheral components of negative pressure release port 9. In the description below, the right side in FIG. 2 is referred to as one end side or the front surface side, and the left side in FIG. 2 is referred to as the other end side or the rear surface side.

First, with reference to FIG. 2, the attachment of negative pressure release port 9 to main body 2 is described. As illustrated in FIG. 2, through hole 7a that causes external space 6a of outer box 6 and internal space 5a of inner box 5 to communicate with each other is formed in urethane foam heat-insulating material 7 filled in the space between inner box 5 and outer box 6.

Openings are formed in positions in inner box 5 and outer box 6 corresponding to through hole 7a. Pipe guide 10 is fixed in through hole 7a, and negative pressure release port main body 11 is inserted in pipe guide 10.

As illustrated in FIG. 2 and FIG. 3, negative pressure release port main body 11 includes pipe 12, packing 13, valve guide 14, valve spring 15, valve main body 16, base 17, and heating element 18.

As illustrated in FIG. 2 and FIG. 3, pipe 12 is a member having a substantially cylindrical shape and made of resin such as PBT, for example. Pipe 12 includes holding portion 12b holding heating element 18 on one end side of cylindrical portion 12a, and further includes ribs 12d connecting inner wall surface 12c of cylindrical portion 12a and holding portion 12b to each other. One end of pipe 12 is exposed to internal space 5a.

Holding portion 12b is provided in a central portion of pipe 12, and includes holding cylindrical portion 12ba extending in the axial direction of pipe 12, and holding bottom portion 12bb that blocks up one end side of holding cylindrical portion 12ba.

Ribs 12d are provided in three places at regular intervals in the circumferential direction, and each connect the outer peripheral surface of holding cylindrical portion 12ba and inner wall surface 12c of cylindrical portion 12a to each other. The space between adjacent ribs 12d functions as a flow path through which air passes.

Enlarged-diameter portion 12e is provided on the other end of cylindrical portion 12a via an enlarged-diameter tapered portion. Flange portion 12f extending to the outer diameter side is provided on the other end side of enlarged-diameter portion 12e. In flange portion 12f, insertion holes into which screws for fixing pipe 12 to base 17 are inserted are formed in two places diagonal to each other. As illustrated in FIG. 2, enlarged-diameter portion 12e has enlarged-diameter extending portion 12g extending to the other end side with respect to flange portion 12f.

As illustrated in FIG. 2 and FIG. 3, packing 13 is a ring-shaped member, and annular groove 13a is formed in a side surface thereof. As illustrated in FIG. 2, packing 13 on one end side seals a space between pipe 12 and valve guide 14 by being sandwiched between pipe 12 and valve guide 14 in a state in which annular groove 13a is fitted with enlarged-diameter extending portion 12g of pipe 12.

Packing 13 on the other end side seals a space between valve guide 14 and base 17 by being sandwiched between valve guide 14 and base 17 in a state in which annular groove 13a is fitted with annular protruding portion 17e (details are described later) of base 17.

As illustrated in FIG. 2 and FIG. 3, valve guide 14 is a stepped-cylindrical member made of resin. Valve guide 14 includes first cylindrical portion 14a, disk portion 14b extending from the other end of first cylindrical portion 14a to the outer diameter side, and second cylindrical portion 14c extending from an end portion of disk portion 14b on the outer diameter side to the other end side.

As described above, packing 13 on one end side is in abutment with the surface of disk portion 14b on one end side, and valve spring 15 is in abutment with the surface of disk portion 14b on the other end side. As described above, packing 13 on the other end side is in abutment with the surface of second cylindrical portion 14c on the other end side. Plurality of ribs 14d extending to the inner diameter side are provided on the inner peripheral surface of second cylindrical portion 14c, and inner diameter ends of ribs 14d guide the outer peripheral surface of valve main body 16. The space between adjacent ribs 14d functions as a flow path through which air passes.

Valve spring 15 is a so-called coil spring formed by winding a wire rod. In this embodiment, the wire diameter of valve spring 15 is 0.5 mm, for example, and the set load is 7 grams, for example. Therefore, the port opens by a slight pressure difference between internal space 5a and external space 6a.

As illustrated in FIG. 2 and FIG. 3, valve main body 16 includes disk portion 16a, tapered portion 16b extending from an outer peripheral end of disk portion 16a to one end side as enlarging the diameter thereof, and cylindrical portion 16c extending from an outer peripheral end of tapered portion 16b to the one end side. Erected portion 16d erected to one end side is provided on disk portion 16a.

As illustrated in FIG. 2 and FIG. 3, tapered portion 16b forms a valve with packing 13 on the other end side. As described above, the outer peripheral surface of cylindrical portion 16c is guided to inner diameter ends of ribs 14d of valve guide 14.

As illustrated in FIG. 2 and FIG. 3, erected portion 16d is formed from central portion 16da erected on the center of disk portion 16a, and six radial sheet portions 16db extending from central portion 16da to the outer side in the radial direction.

The inner peripheral surface of valve spring 15 is guided to outer diameter ends of radial sheet portions 16db. The space between adjacent radial sheet portions 16db functions as a flow path through which air passes.

As illustrated in FIG. 2 and FIG. 3, base 17 includes cylindrical portion 17a, first flange portion 17b extending from the other end of cylindrical portion 17a to the outer side in the radial direction, and outer wall portion 17c extending from the outer diameter side of first flange portion 17b to one end side.

As illustrated in FIG. 2, base 17 includes second flange portion 17d extending from the other end of cylindrical portion 17a to the inner side in the radial direction. As described above, annular protruding portion 17e fitting with annular groove 13a in packing 13 on the other end side is formed on a surface on one end side of second flange portion 17d. In the outer periphery of cylindrical portion 17a, screw holes 17f in which screws that fix pipe 12 and base 17 to each other are screwed are formed in two places diagonal to each other.

In this embodiment, packing 13, valve guide 14, valve spring 15, valve main body 16, and base 17 form a check valve that allows air to flow into internal space 5a from external space 6a and prevents air from flowing out from internal space 5a to external space 6a.

The configuration of the check valve is not limited to the above. A ball may be used as valve main body 16, or a spring other than the coil spring may be used as valve spring 15. Other types of check valves such as a reed valve and the like may be used. However, the check valve structure of this embodiment is preferable in terms of securing mounting space and flow path area.

In this embodiment, pipe 12 has a stepped-cylindrical shape having a small-diameter portion and a large-diameter portion, and the check valve is connected to the large-diameter portion of pipe 12. Therefore, the diameter of the check valve can be increased, and a high flow rate of the air passing through the check valve can be secured.

As illustrated in FIG. 2 and FIG. 3, heating element 18 includes heating element main body 18a held by holding portion 12b, and electric power line 18b extending from heating element main body 18a and connected to a power supply apparatus (not shown). Although details are omitted in FIG. 2, electric power line 18b passes through the inside of pipe 12, and is guided to the outside of pipe 12 from a hole formed in flange portion 12f of pipe 12.

Heating element main body 18a is formed by winding nichrome wire around a glass rod. Heating element 18 generates heat by being supplied with power from the power supply apparatus via electric power line 18b. As a result, the air in pipe 12 is heated.

In this embodiment, heating element 18 is configured to constantly generate heat at 50° C. to 60° C. while binary refrigeration apparatus 1 is operating. A temperature sensor may be provided in pipe 12 to cause the amount of heat generation of heating element 18 to be changed in accordance with the temperature in pipe 12. As a result, energy consumption can be suppressed.

Next, peripheral components of negative pressure release port 9 are described with reference to FIG. 2 and FIG. 4. As illustrated in FIG. 4, pipe guide 10 is formed from pipe guide main body 19, pipe holder 20, and pipe packing 21.

As illustrated in FIG. 2 and FIG. 4, pipe guide main body 19 includes stepped-cylindrical portion 19a of which diameter on the other end side is larger than the diameter on one end side. On one end of stepped-cylindrical portion 19a, flange portion 19b extending to the outer diameter side and locking portions 19c in two places further extending from flange portion 19b to the outer diameter side are provided.

Base portion 19d extending to the outer diameter side is provided on the other end of stepped-cylindrical portion 19a. As illustrated in FIG. 2, base portion 19d is attached to a wall surface of outer box 6.

As illustrated in FIG. 2 and FIG. 4, pipe holder 20 includes base portion 20a attached to the wall surface of inner box 5, and cylindrical portion 20b extending from base portion 20a to the other end side. Holes with which locking portions 19c of pipe guide main body 19 are locked are formed in the peripheral surface of cylindrical portion 20b.

Pipe packing 21 is a ring-shaped member, and is sandwiched between a surface of flange portion 19b of pipe guide main body 19 on one end side and a surface of base portion 20a of pipe holder 20 on the other end side.

Port cover 22 is formed by bending a thin metal sheet, and cutouts 22c for causing air to pass therethrough are formed in erected portion 22b erecting from the edge of planar portion 22a. Port cover 22 is fixed to outer box 6 by screwing attachment portions 22d to the wall surface of outer box 6.

Next, with reference to FIG. 2, cover member 23 attached to rear surface-side inner wall 5b of inner box 5 is described. Cover attachment member 24 made of sheet metal is screwed to rear surface-side inner wall 5b of inner box 5 so as to protrude to the front surface side, and cover member 23 is fixed to inner box 5 by being suspended to and hanged from cover attachment member 24.

Cover member 23 is formed by bending a thin metal sheet, and is a box having an open rear surface side and an open lower side. Wall surface 23a is provided on cover member 23 so as to be separated from rear surface-side inner wall 5b of inner box 5 by a predetermined distance to the front surface side.

Long holes 23b are formed in wall surface 23a at a place above a position in which pipe 12 of negative pressure release port 9 is exposed to internal space 5a. As illustrated in FIG. 2, long holes 23b are similarly formed in a side surface of cover member 23.

Next, the operation of negative pressure release port 9 is described with reference to FIG. 2. FIG. 2 illustrates a state in which the pressures of external space 6a and internal space 5a are balanced, and negative pressure release port 9 is closed.

When negative pressure release port 9 is in the state of FIG. 2, there is no pressure difference between external space 6a and internal space 5a, and hence front surface door 3 can be opened. When front surface door 3 is opened and closed, the air that has flowed in from external space 6a is trapped in internal space 5a and is rapidly cooled. As a result, the pressure of internal space 5a becomes lower than the pressure of external space 6a.

Therefore, in negative pressure release port 9, valve main body 16 is separated from packing 13 on the other end side against the pressing pressure of valve spring 15. As a result, the air in external space 6a flows into pipe 12 through the gap between packing 13 and valve main body 16, the space between adjacent ribs 14d, and the space between adjacent radial sheet portions 16db.

At this time, the inside of pipe 12 is heated by heating element 18, and hence a case where the air that has flowed into pipe 12 from external space 6a is rapidly cooled and frozen in pipe 12 does not occur.

The air that has flowed into internal space 5a through pipe 12 collides with wall surface 23a of cover member 23 and is rapidly cooled. At this time, a part of the moisture contained in the air becomes fine ice and adheres to wall surface 23a or drops on the floor surface of inner box 5.

The air that has flowed into internal space 5a is warmer than the air that has already existed in internal space 5a, and hence rises in cover member 23 and tries to move to the outside of cover member 23 through long holes 23b on the upper portion.

At this time, a part of the moisture contained in the air further cooled while rising becomes fine ice, and adheres to edges of long holes 23b. Therefore, a large part of fine ice generated when the air in external space 6a flows into internal space 5a drops on the floor surface of inner box 5 or is collected in cover member 23.

In this embodiment, cover member 23 is a box having an open rear surface side and an open lower side, but the present invention is not limited thereto. For example, the lower surface may be closed, and all the fine ice generated when the air in external space 6a flows into internal space 5a may be caused to adhere to cover member 23 and collected.

In this embodiment, heating element 18 is held by holding portion 12b, but the present invention is not limited thereto. For example, heating wire may be used as heating element 18, and the heating wire may be held by sticking the heating wire on inner wall surface 12c of pipe 12 by a heat-resisting adhesive tape and the like.

As described above, according to this embodiment, heating element 18 is disposed in pipe 12 on one end side thereof, and hence the air in pipe 12 on one end side of the inside of pipe 12 can be efficiently heated. In addition, effects described below can be obtained.

Pipe 12 is made of resin having low heat conductivity, and hence the occurrence of condensation on inner wall surface 12c of pipe 12 can be suppressed. In addition, the transmission of the heat in the air in pipe 12 to the outside of pipe 12 can be suppressed.

Heating element 18 is disposed in pipe 12, and hence pipe guide 10 can be disposed on the outer peripheral side of pipe 12 almost without any gap. As a result, the diameter of pipe guide 10 can be reduced. Therefore, a part that is not filled with the heat-insulating material can be reduced, and the cooling effect can be enhanced.

Heating element 18 is disposed in pipe 12, and hence the air in pipe 12 can be heated with a lower power consumption as compared to when heating element 18 is wound around the outer periphery of pipe 12. As a result, energy consumption can be suppressed.

Heating element 18 is connected to cylindrical portion 12a via ribs 12d, and hence heat generated by heating element 18 is transmitted to cylindrical portion 12a via ribs 12d. As a result, in particular, a place in cylindrical portion 12a close to one end thereof can be heated. Therefore, even when frost adheres to cylindrical portion 12a, the adhering frost can be melted, and the frost can be prevented from accumulating and blocking the flow path.

The check valve is disposed on the other end side with respect to heating element 18, and hence the air in pipe 12 heated by heating element 18 can be prevented from flowing out to external space 6a. As a result, the temperature of the air in pipe 12 can be raised as appropriate.

The structure in which negative pressure release port main body 11 is inserted in pipe guide 10 is provided. As a result, even when a situation where heating element 18 breaks down and the air in the flow path cannot be heated occurs, the situation can be dealt with by pulling out negative pressure release port main body 11 from pipe guide 10 and replacing negative pressure release port main body 11.

Cover member 23 is provided so as to cover one end of pipe 12, and wall surface 23a of cover member 23 is provided so as to be opposed to rear surface-side inner wall 5b of inner box 5 and separated therefrom by a predetermined distance to the front surface side. As a result, the fine ice generated when the moisture contained in the air that has flowed into internal space 5a through pipe 12 freezes collides with wall surface 23a and drops. Therefore, the fine ice can be collected in one place, and the defrosting operation becomes easier.

Long holes 23b are formed in the upper portion of wall surface 23a. As a result, the fine ice generated when the moisture included in the air flowing into internal space 5a and rising in internal space 5a freezes is collected in long holes 23b. Therefore, the defrosting operation only needs to be performed by removing cover member 23, and the defrosting operation becomes easier.

In the abovementioned embodiment, the set load of valve spring 15 is 7 grams so that the port opens with a slight pressure difference. However, the port may be set to not open with only a pressure difference between the inside and the outside that occurs in a steady state. The configuration is described below.

When a part of the air in internal space 5a is replaced when front surface door 3 is opened and closed, the air trapped in internal space 5a is rapidly cooled. When the temperature of internal space 5a reaches a set temperature, binary refrigeration apparatus 1 shifts to a steady operation state. The steady operation is an operation that tries to maintain internal space 5a at a set temperature after internal space 5a reaches the set temperature and is an operation in which the temperature of internal space 5a repeatedly fluctuates between an upper limit value and a lower limit value. By the steady operation, the temperature of internal space 5a is maintained within a predetermined temperature range. The predetermined temperature range is a range within plus or minus 3° C. from the set temperature, for example.

The temperature of internal space 5a after shifting to the steady operation state repeatedly rises and drops within the predetermined temperature range. This is because binary refrigeration apparatus 1 is repeatedly turned off and on so that the temperature of internal space 5a becomes the set temperature. At this time, the pressure of internal space 5a also repeatedly rises and drops in accordance with the fluctuation of the temperature.

By setting the set load so that the pressure difference between external space 6a and internal space 5a becomes slightly large, air can be prevented from flowing into internal space 5a in the steady operation state in a more reliable manner. The set load to be set is 40 grams, for example.

As a result, frost can be prevented from adhering to cylindrical portion 12a of negative pressure release port 9 in a more reliable manner in a steady operation state in which the temperature of internal space 5a is maintained within a predetermined temperature range. There is no need to melt the frost in the steady operation state, and hence the amount of heat generation of heating element 18 can be suppressed.

Meanwhile, even when the set load is set as above, when front surface door 3 is opened and closed and air flows into internal space 5a and is rapidly cooled, the air can be caused to flow into internal space 5a through negative pressure release port 9 because the pressure difference is large. As a result, the pressure difference between external space 6a and internal space 5a decreases, and hence front surface door 3 can be easily opened and closed.

An example in which negative pressure release port 9 is attached to the rear surface of main body 2 has been described above, but the attachment position of negative pressure release port 9 is not limited thereto. For example, negative pressure release port 9 may be attached to front surface door 3. In that case, inertial force is applied to fine ice that has adhered to pipe 12 of negative pressure release port 9 in accordance with the opening and closing of front surface door 3, and hence the fine ice can be caused to easily drop.

An embodiment of the present invention has been described above, but the present invention is not limited to the abovementioned embodiment, and can be carried out with changes, as appropriate, without departing from the gist of the present invention.

All disclosed contents in the specification, the accompanying drawings, and the abstract included in Japanese Patent Application No. 2016-177697 filed on Sep. 12, 2016 are incorporated herein.—

INDUSTRIAL APPLICABILITY

The negative pressure release port according to the present invention is suitable for being applied to an ultra-low temperature binary refrigeration apparatus that stores cells, microorganisms, and the like.

REFERENCE SIGNS LIST

1 Binary refrigeration apparatus
2 Main body
3 Front surface door
4 Machine room
5 Inner box
5a Internal space
5b Rear surface-side inner wall
6 Outer box
6a External space
7 Urethane foam heat-insulating material
7a Through hole
8 Hinge
9 Negative pressure release port
10 Pipe guide
11 Negative pressure release port main body
12 Pipe
12a Cylindrical portion
12b Holding portion
12ba Holding cylindrical portion
12bb Holding bottom portion
12c Inner wall surface
12d Rib
12e Enlarged-diameter portion
12f Flange portion
12g Enlarged-diameter extending portion
13 Packing
13a Annular groove
14 Valve guide
14a First cylindrical portion
14b Disk portion
14c Second cylindrical portion
14d Rib
15 Valve spring
16 Valve main body
16a Disk portion
16b Tapered portion
16c Cylindrical portion
16d Erected portion
16da Central portion
16db Radial sheet portion
17 Base
17a Cylindrical portion
17b First flange portion
17c Outer wall portion
17d Second flange portion
17e Annular protruding portion
17f Screw hole
18 Heating element
18a Heating element main body
18b Electric power line
19 Pipe guide main body
19a Cylindrical portion
19b Flange portion
19c Locking portion
19d Base portion
20 Pipe holder
20a Base portion
20b Cylindrical portion
21 Pipe packing
22 Port cover
22a Planar portion
22b Erected portion
22c Cutout
22d Attachment portion
23 Cover member
23a Wall surface
23b Long hole
24 Cover attachment member

The invention claimed is:

1. A negative pressure release port, comprising:
a cylindrical member that allows a fluid to pass through an inside of the cylindrical member;
a heating element disposed in the cylindrical deal member on one end side of the cylindrical member;
a holding member comprising a holding cylindrical portion extending in an axial direction of the cylindrical member and a holding bottom portion that blocks up one end side of the holding cylindrical portion in the axial direction of the cylindrical member, wherein the heating element is inserted into the holding member such that an inner surface of the holding cylindrical portion is in contact an outer surface of the heating element;
a connecting portion that connects an inner peripheral wall of the cylindrical member and the holding member to each other; and
a valve provided on another end side with respect to the heating element, the valve allowing the fluid passing through the inside of the cylindrical member to flow from the other end side to the one end side, the valve preventing the fluid from flowing from the one end side to the other end side, wherein:
the connecting portion comprises a plurality of ribs protruding from the inner peripheral wall of the cylindrical member to the holding member and contacting the holding cylindrical portion of the holding member, and heat generated by the heating element is transmitted to a cylindrical portion of the cylindrical member via the plurality of ribs, the plurality of ribs being located inside the cylindrical member, and
the holding member is provided in a central portion of the cylindrical member.

2. The negative pressure release port according to claim 1, wherein the valve comprises:
a valve seat;
a valve main body; and
a biasing member that biases the valve main body toward the valve seat.

3. A refrigeration apparatus, comprising:
the negative pressure release port according to claim 1; and
a box separated from an external space by a heat insulating member, the box having an internal space in which an item is accommodated, wherein the negative pressure release port is provided in a through hole formed in the heat insulating member of the box so as to cause the external space and the internal space to communicate with each other, the negative pressure release port being provided in a state in which the one end side is exposed to the internal space and the other end side is exposed to the external space.

4. The refrigeration apparatus according to claim 3, further comprising a cover member fixed to an inner wall of the box, the cover member covering the one end side of the cylindrical member, wherein the cover member has a wall surface in a position separated by a predetermined distance to the one end side from a position in which the one end side of the cylindrical member is exposed.

5. The refrigeration apparatus according to claim 4, wherein the cover member has a hole that allows a fluid to pass therethrough, the hole being formed above the position in which the one end side of the cylindrical member is exposed.

6. The refrigeration apparatus according to claim 3, wherein the valve does not allow the fluid passing through the inside of the cylindrical member to flow from the other end side to the one end side when a temperature of the internal space is a temperature within a predetermined temperature range after operation is shifted to a steady operation.

7. The negative pressure release port according to claim 1, wherein the valve is disposed at one end of the cylindrical member.

* * * * *